United States Patent
Noceti

(10) Patent No.: US 9,052,020 B2
(45) Date of Patent: Jun. 9, 2015

(54) SHUT-OFF MEMBER OF A PRESSURE REDUCING VALVE OF A PRESSURE REGULATOR DEVICE, AND PRESSURE REGULATOR DEVICE HAVING SUCH SHUT-OFF MEMBER

(71) Applicant: MARES S.p.A., Rapallo (GE) (IT)

(72) Inventor: Dante Noceti, Santa Margherita Ligure (IT)

(73) Assignee: MARES S.P.A., Rapallo (GE) (IT)

( * ) Notice: Subject to any disclaimer, the term of this patent is extended or adjusted under 35 U.S.C. 154(b) by 145 days.

(21) Appl. No.: 13/783,741

(22) Filed: Mar. 4, 2013

(65) Prior Publication Data

US 2013/0228240 A1    Sep. 5, 2013

(30) Foreign Application Priority Data

Mar. 5, 2012  (IT) .............................. GE2012A0026

(51) Int. Cl.
| | | |
|---|---|---|
| *G05D 16/06* | (2006.01) | |
| *F16K 5/08* | (2006.01) | |
| *A62B 9/02* | (2006.01) | |
| *B63C 11/22* | (2006.01) | |
| *F16K 1/36* | (2006.01) | |

(52) U.S. Cl.
CPC ...... *F16K 5/08* (2013.01); *F16K 1/36* (2013.01); *A62B 9/022* (2013.01); *B63C 11/22* (2013.01); *G05D 16/0666* (2013.01); *B63C 11/2209* (2013.01)

(58) Field of Classification Search
CPC ..... F16K 1/36; G05D 16/0663; G05D 16/0666
USPC ............. 137/505.18, 505.35, 505.37, 505.41, 137/505.42; 251/356, 358, 333
See application file for complete search history.

(56) References Cited

U.S. PATENT DOCUMENTS

| | | | | |
|---|---|---|---|---|
| 2,225,081 A | * | 12/1940 | O'Hare ............................. | 156/87 |
| 2,368,887 A | * | 2/1945 | Schuler ......................... | 251/358 |
| 5,139,046 A | | 8/1992 | Galli | |
| 5,413,096 A | * | 5/1995 | Hart .......................... | 128/205.24 |
| 5,746,198 A | | 5/1998 | Taba | |
| 5,911,220 A | * | 6/1999 | Morgan et al. ........... | 128/205.24 |
| 2006/0097213 A1 | | 5/2006 | Stradella | |

* cited by examiner

*Primary Examiner* — Craig Schneider
*Assistant Examiner* — R. K. Arundale
(74) *Attorney, Agent, or Firm* — Themis Law

(57) ABSTRACT

A shut-off member of a pressure reducing valve of a pressure regulator device, such as a diaphragm-type first stage for scuba diving, includes an enlarged head connected to a shaft and cooperating with a valve seat that separates a chamber supplied with high pressure gas from a chamber in which gas is at a lower pressure. The enlarged head and an end section of predetermined length of the shaft, connected to the enlarged head, are seamlessly coated with at least one layer of elastomeric material. Such coating of elastomeric material is limited to an end portion of the shaft connected to the enlarged head and the coated shaft portion is entirely contained in the high-pressure chamber in any operating position of the shut-off member.

15 Claims, 9 Drawing Sheets

SHUT-OFF MEMBER OF A PRESSURE REDUCING VALVE OF A PRESSURE REGULATOR DEVICE, AND PRESSURE REGULATOR DEVICE HAVING SUCH SHUT-OFF MEMBER

FIELD OF THE INVENTION

The present invention relates to a shut-off member of a pressure reducing valve of a pressure regulator device, and pressure regulator device having such shut-off member.

BACKGROUND OF THE INVENTION

Air supply and pressure regulator devices are known, for instance for use in scuba diving, and generally have a double stage, where the first pressure reducing stage is connected to a high-pressure source of breathable gas, such as a tank filled to a pressure of 200-300 bar, and is designed to reduce said pressure to a predetermined intermediate pressure.

Generally, such first pressure reducing state includes a body having an inlet connected to a high-pressure source of breathable gas and an outlet for the breathable gas at a reduced pressure as compared with the inlet gas pressure. Said body is divided into at least one high-pressure gas chamber, communicating with said inlet, and a low-pressure gas chamber, connected with said outlet, said low-pressure gas chamber communicating with the high-pressure gas chamber by means of a pressure reducing valve.

Said pressure reducing valve comprises a valve seat that separates the high-pressure chamber from the low-pressure chamber, and cooperates with a shut-off member, having an enlarged head connected to a shaft, i.e. a piston shut-off member.

Such shut-off member is held within the high-pressure chamber and is axially displaceable, i.e. is parallel to its longitudinal axis, in either direction within said high-pressure chamber, such that the enlarged head alternately runs a stroke in which it moves off and away from the valve seat and a stroke in which it moves toward and against said valve seat. The shaft is supported in a fluid-tight manner in a guide hole formed in a wall of the high-pressure chamber, facing away from the valve seat, using a seal member, such as an O-ring, which is designed to delimit the opening of said hole.

Various types of shut-off members are known.

U.S. Pat. No. 5,139,046 discloses a metal piston shut-off member, having a head and a shaft integral with said head, with a molded coating of plastic material.

The plastic coating material extends on the body of the shut-off member from a groove formed in the head on the face facing away from the shaft to a shoulder formed near the lower end of the shaft. Therefore, the plastic coating covers all the parts of the shut-off member that are exposed to high pressure.

Particularly, as shown in FIG. 3, the plastic coating material is also provided in the shaft portion that is designed to cooperate with the seal member, i.e. the o-ring, that is adapted to delimit the guide hole through which the shaft of the shut-off member slides, which hole is formed in the wall of the high-pressure chamber, opposite to the valve seat. Thus, the shaft has no uncoated portions where the shut-off member is exposed to high pressure and the shaft and the plastic coating material have no junction surfaces in the high-pressure gas-containing part of the device, which might cause separation of the two materials: this will limit or avoid penetration of microbubbles between the shaft metal and the coating.

The shut-off member disclosed in U.S. Pat. No. 5,139,046 provides a simple process for securely molding plastic material, and avoids any junction between the metal and the plastic coating that might be exposed to high-pressure stress, thereby avoiding peeling damages or the like.

Nevertheless, since the plastic material coats both the head and the shaft of the shut-off member, such material shall be adapted to cooperate both with the valve seat and with the o-ring that delimits the opening through which the shaft slides, for sealing off the high-pressure chamber.

Therefore, the coating of the U.S. Pat. No. 5,139,046 has chemico-physical properties that result from a compromise between the rigidity required at the shaft, to allow the latter to slide through the opening, and the softness required at the head, to ensure sealing of the valve seat.

Particularly, if the coating material for the head and the shaft is too soft, it will be prone to deformation on the shaft where cooperation with the O-ring occurs, resulting in increased friction during the movement of the shut-off member and in delayed closing/opening of the valve seat. Conversely, if the coating material is too rigid, an imperfect seal may be obtained when the head of the shut-off member abuts against the valve seat.

U.S. Pat. No. 7,341,073 (Publication Number U.S. 2006/0097213) discloses a piston shut-off member having a central body at least partially covered with a first layer of rigid plastic material, such layer being at least partially covered with a second layer of plastic material, which is less rigid than the one of the first layer.

Like for U.S. Pat. No. 5,139,046, the first layer of rigid plastic material 3 extends substantially along the entire length of the shaft and particularly also covers the shaft portion that is designed to cooperate with the seal element, i.e. the O-ring, which is adapted to delimit the guide hole through which the shaft of the shut-off member slides. Therefore, the first layer of rigid plastic material 3 covers all the parts of the shut-off member that are exposed to high pressure, and avoid the presence of shaft/coating junction surfaces in the high-pressure area, that might cause peeling off of the coating, due to exposure to high-pressure gas.

In order to obviate the problem of plastic deformation on the shaft where cooperation with the O-ring occurs, resulting in increased friction during the movement of the shut-off member, as well as delayed closing/opening of the valve seat, and eventually inappropriate operation of the pressure regulator device, U.S. Pat. No. 7,341,073 provides a coating for the shut-off member that is composed of two plastic layers, where the head of the shut-off member is overcoated with a second layer of a plastic material that is softer than the first layer of plastic material that coats the shaft and head of the shut-off member.

Therefore, the rigid layer is more adapted to allow the shaft to slide through the O-ring that delimits the guide hole of the shut-off member, whereas the soft layer ensures optimal closing of the valve seat.

Nevertheless, this technical arrangement adds complexity to fabrication of the shut-off member, as it requires molding of two layers of chemically different materials, one above the other.

Particularly, since the shut-off member of U.S. Pat. No. 7,341,073 is required to be coated by two plastic coating layers that must be compatible with each other, this chemical compatibility between the rigid and less rigid layers will restrict the selectable materials.

Furthermore, in order to ensure that the shaft has no uncoated portion where the shut-off member is exposed to high pressure and to limit or prevent penetration of microbubbles between the shaft metal and the coating, the part of the shaft exposed to high pressure is coated as follows: as shown in FIG. 1 (where the shut-off member is shown in the valve seat closing position) and as described on page 3, lines 6-9, the first layer of the rigid plastic material (3) covers the shaft almost to the end opposite to the head, and particularly covers the shaft portion that is designed to cooperate with the seal element or O-ring, that delimits the guide and slide hole formed in the wall of the high-pressure chamber, which is opposite to the valve seat.

Such coating extends to such a length that said first coating layer contacts and cooperates with the O-ring in any operating state of the shut-off member, i.e. in either valve seat closing or opening state of said shut-off member. Therefore, the plastic layer that covers the shaft end opposite to the head, may be deformed or altered by contact with the seal element, which is designed to seal the high-pressure chamber at the hole through which said shaft end slides, resulting in increased friction during operation and/or gas leakage at said seal.

In further prior art technical arrangements, plastic overmolding is only provided at the head part of the shut-off member, using an adhesive layer to improve adhesion between the plastic layer (coated over a small area) and the metal that forms the body of the shut-off member, thereby limiting penetration of gas microbubbles between the layers of different natures.

The U.S. Pat. No. 5,746,198 discloses a metal shut-off member having a circular head supported by a shaft.

The shaft portion has no plastic coating, whereas the enlarged circular head is coated with a rubber-like plastic or elastomeric material.

Such plastic material is adhered to the metal head using chemical or mechanical means. This is required because the head of the shut-off member, namely the junction between the head and the shaft is exposed to high pressure and the plastic coating and the metal of the shut-off member are chemically incompatible.

An adhesive is provided between the head surface and the plastic or elastomeric material, to resist peeling off during exposure to high-pressure gas.

A shoulder is provided at the junction between the shaft and the head, whose diameter is slightly greater than the diameter of the shaft.

The shoulder provides support to a washer that is pushed against the shoulder (the washer is made of a metal that is preferably harder than the metal of the shoulder), to prevent peeling off of the plastic material during exposure to high pressure.

Nevertheless, these arrangements increase the complexity and costs for fabricating the shut-off member (as they require a combination of a metal washer and an adhesive layer for holding the plastic coating of the head in position) and do not prevent gas microbubbles in the high-pressure chamber from penetrating between the metal of the shut-off member and the plastic material, thereby causing the coating to be peeled off, and resulting in inadequate operation of the pressure regulator device.

A further prior art arrangement involves the use of a shut-off member having a rubber head, in which a rubber or elastomeric pad is embedded in a cup-shaped end housing formed on the head of the shut-off member. The drawback of this type of shut-off members is that rubber can be easily cut, and cause inadequate operation of the pressure reducing valve. Furthermore, due to the small rubber/metal contact area in the shut-off member, the rubber part may be easily peeled off, possibly due to penetration of gas microbubbles between the pad and the metal head.

SUMMARY OF THE INVENTION

An object of the present invention is to provide a shut-off member of a pressure reducing valve that is not affected by the above drawbacks.

Particularly, an object of the present invention is to provide a piston shut-off member having a radially enlarged head, wider than the shaft, and coated with at least one layer of elastomeric material, said coated head cooperating with a seat of a pressure reducing valve and perfectly sealing said seat with no risk that said elastomeric layer might be peeled off or removed, and a shaft that can cooperate with the seal element, such as an O-ring, at the opening through which the shaft slides in said high-pressure chamber, with no risk of deformation and/or alteration of the materials that form said shaft and said O-ring.

Another object of the present invention is to provide a piston shut-off member that is reliable, easy to make and inexpensive.

Therefore, the present invention relates to a shut-off member of a pressure reducing valve of a pressure regulator device, such as a diaphragm-type first stage for underwater diving, which shut-off member comprises an enlarged head connected to a shaft and cooperates with a valve seat that separates a chamber supplied with high pressure gas from a chamber in which gas is at lower pressure, said enlarged head and an end section of predetermined length of the shaft, connected to said enlarged head being seamlessly coated with at least one layer of elastomeric material, said predetermined length being such that the coated end section of the shaft is entirely contained in the high-pressure chamber (301) in any operating position of the shut-off member.

This means that said coating of elastomeric material is limited to an end portion of the shaft connected to the enlarged head and said coated shaft portion is entirely contained in the high-pressure chamber in any operating position of the shut-off member.

Therefore, the elastomeric coating does not extend to the shaft portion that is designed to cooperate with the seal element that sealingly delimits the shaft guiding hole formed in a wall of the chamber supplied with high-pressure gas, opposite to the valve seat.

Therefore, since the elastomeric layer only coats the enlarged head and a portion of the shaft, there is no contact between said elastomeric coating and said seal element, neither when the shut-off member moves in the high-pressure chamber off and away from the valve seat, nor when the shut-off member moves toward and against said valve seat.

The present invention also relates to an air supply and pressure regulator device, e.g. a diaphragm-type first stage for underwater diving, wherein said device comprises a shut-off member that cooperates with the seat of the pressure reducing valve, said shut-off member being formed according to the characteristics of the present invention.

According to the present invention, the shaft of the shut-off member has a radially narrowed end portion at its end connected to the enlarged head, forming an annular step or an annular shoulder on the circumference that connects it to the remaining portion of the shaft.

The elastomeric coating covers the enlarged heat and has a bush-like extension that covers a section of the shaft that corresponds to the narrowed portion.

The body of the shut-off member may be solid or, according to one embodiment, the body of the shut-off member may have a through hole axially extending through the enlarged head and the shaft, with an opening formed on the free base of the shaft and an opening formed on the top face of the enlarged head, facing away from the shaft.

The top face of the enlarged head, facing away from the shaft, and acting as an abutment surface against the valve seat, may include an axial extension of the shaft, terminating with an annular flange that surrounds the opening of said through hole.

In the present invention, the surface of the enlarged head, namely the lower and/or upper surface, and the surface of the shaft, namely the surface of the radially narrowed end portion, have one or more separate or continuous recesses, arranged in predetermined patterns.

For instance, in one embodiment, a particular knurling or a number of troughs may be provided on said surface.

In one exemplary embodiment, one or more annular grooves may be provided on one or both faces of the enlarged head.

These grooves may be provided in combination with or instead of one or more peripheral annular grooves formed on the axial extension and/or on the shaft, particularly on the radially narrowed end portion.

A continuous spiral groove, or a number of concentric annular paths disposed in equally or differently spaced arrangements may be formed on these surfaces.

In one embodiment, the elastomeric coating has one or more bulges on its surface, which are formed by the material that forms said elastomeric coating.

These bulges are preferably formed on the bush-like extension of the coating that covers the radially narrowed end portion of the shaft.

Particularly, one or more bulges, particularly annular bulges are formed on the surface of said narrowed portion, at or near the annular step or the annular shoulder of the shaft and/or at the radially narrowed end portion, particularly at or offset from the recesses, such as the annular recesses (111), and act as resilient engagement members for elastically retaining a containing cap for the enlarged head in abutment against the enlarged head.

Such cap may also act as a slide guide, as it is adapted to slide with the shut-off member in the pressure regulator device, particularly in the high-pressure chamber.

These bulges may be either separate or continuous and arranged along a spiral line, or a number of concentric annular paths disposed in equally or differently spaced arrangements on the surface of said elastomeric coating.

In a preferred embodiment, such shut-off member is provided in combination with a containing cap for the enlarged head of the shut-off member, which cap, according to a further embodiment, may also act as a slide guide for said shut-off member in the pressure regulator device.

The cap has a bell part for tightly receiving the enlarged head, which bell part is connected, and preferably formed of one piece with a central tubular extension whose inside diameter is substantially identical or larger than the diameter of the shaft coated with the plastic material, so that said cap may be fitted onto the shaft and pushed to abutment against the enlarged head, of the shut-off member (1), particularly against the bottom face of said head and against the lateral edges and the shell surface of said head.

Preferably, at least one annular bulge is provided on the shaft at the end of the bush-like extension of the elastomeric coating at such a distance from the enlarged head that, with the containing and slideably guiding cap in the mounted state, it overlies the end side of the central tubular extension of said cap, thereby creating a mechanical retention action. Preferably, said continuous or discontinuous bulge at the end of the bush-like extension of the elastomeric coating, is located at the annular step or shoulder on the shaft.

During molding, as the elastomeric material penetrates the recesses on the surface of the shut-off member, it both extends the path that the microbubbles are required to cover from the high-pressure chamber to the end area of the shut-off member that cooperates with the valve seat, and provides a larger mechanical adhesion surface.

The elastomeric bulges on the outer surface of the elastomeric coating create multiple sealing areas along the shaft, preventing microbubble penetration between the cap and the elastomeric coating and acting as friction and/or interlocking fit of the cap on the shut-off member.

Therefore, according to the present invention, the elastomeric coating of the shut-off member, which is adapted to ensure resistance to pressure against the valve seat, extends beyond the head over a portion of the shaft, and this extension of the coating, in addition to the provision of recess/es, such as the annular grooves formed on the shaft and the enlarged head, and possibly in addition to the covering action provided by the containing cap, affords an improved resistance to peeling off or removal of the coating, due to penetration of microbubbles under operating pressure conditions.

Furthermore, by limiting the extension of the coating to a portion of the shaft within the high-pressure chamber, in any operating position of the shut-off member, any deformation and/or alteration of the characteristics of the elastomeric material is prevented from causing leakage problems at the base of the shaft, where such shaft is designed to cooperate with seal elements such as O-rings or the like.

Therefore, according to the present invention, the sealing action of the pressure reducing valve is ensured by contact between a soft surface (such as the elastomeric coating of the head of the shut-off member and the O-ring that cooperates with the free end of the shaft) and a hard surface (such as the metal that forms the valve seat and the metal that forms the shaft of the shut-off member). This both ensures a perfect seal, due to contact between a hard surface and a relatively and elastically deformable surface, and prevents contact of two soft materials (such as the elastomeric material that forms the O-ring and the elastomeric material of the coating, should such coating cover the entire shaft, like in prior art shut-off members), which would involve risks of deformation and/or alteration of the chemico-physical properties of the plastic materials (such as adhesion between the elastomeric material of the O-ring and the elastomeric material of the shaft coating, due to continuous and long-lasting contact).

BRIEF DESCRIPTION OF THE DRAWINGS

These and other features and advantages of the invention will be more apparent from the following description of a few embodiments shown in the accompanying drawings, in which.

DETAILED DESCRIPTION OF EMBODIMENTS OF THE INVENTION

Figure 1A:
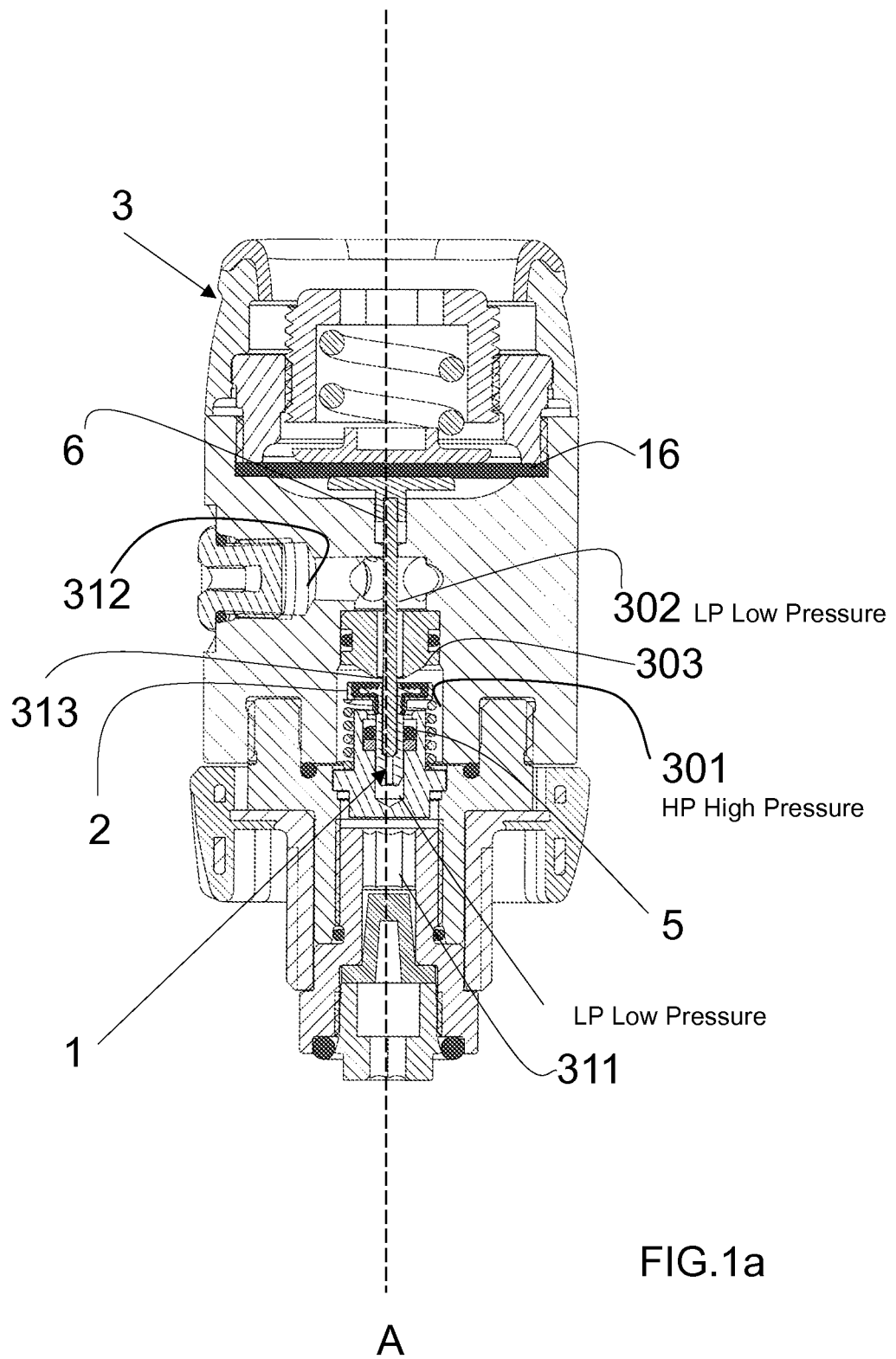
FIG. 1a shows a longitudinal sectional view of a pressure regulator device, particularly a diaphragm-type first stage for underwater diving, with a longitudinal high-pressure gas inlet, and with a pressure reducing valve having a shut-off member of the present invention.

Detailed descriptions of embodiments of the invention are provided herein. It is to be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

Referring to FIGS. 1a, 1b, 1c and 1d, the pressure regulator device 3 has a main body divided into at least one high-pressure chamber 301 having a high-pressure gas inlet 311 and a chamber at lower pressure, so-called low-pressure chamber 302, having a lower-pressure gas inlet 312.

The high-pressure chamber 301 is separated from the low-pressure chamber 302 by a valve seat 313 formed on the separator element 303 for separating said high-pressure chamber 301 from said low-pressure chamber 302, said seat 313 cooperating with a piston shut-off member 1 moving in the high-pressure chamber 301 along a longitudinal axis A of said high-pressure chamber 301, and alternately running a stroke off and away from said seat 313 to open the valve, and a stroke toward and against said valve seat 313 to close the valve.

An element may be provided for guiding the axial movement of the shut-off member 1 in said high-pressure chamber 301.

The shut-off member 1, as shown in detail in FIGS. 2 to 7, has a shaft 101 connected to a radially enlarged head 102, wider than such shaft 101.

Preferably, said shaft 101 is formed of one piece with said enlarged head 102.

Such piston shut-off member 1 has a T-shaped longitudinal section, with a head 102 formed as a disk or plate thinner than the shaft 101.

The shut-off member 1 is made from a hard, high-pressure resistant material, such as metal or the like.

The valve seat 313 consists of an opening formed on the separator element 303, such as a wall, for separating said high-pressure chamber 301 from said low-pressure chamber 302, which opening has an annular sealing lip made of a rigid material, with a sharp crest that may cooperate with an upper surface of the enlarged head 102 of the piston shut-off member 1, to ensure that said seat 313 is perfectly sealed when the shut-off member 1 is in the closed position.

Figure 7:
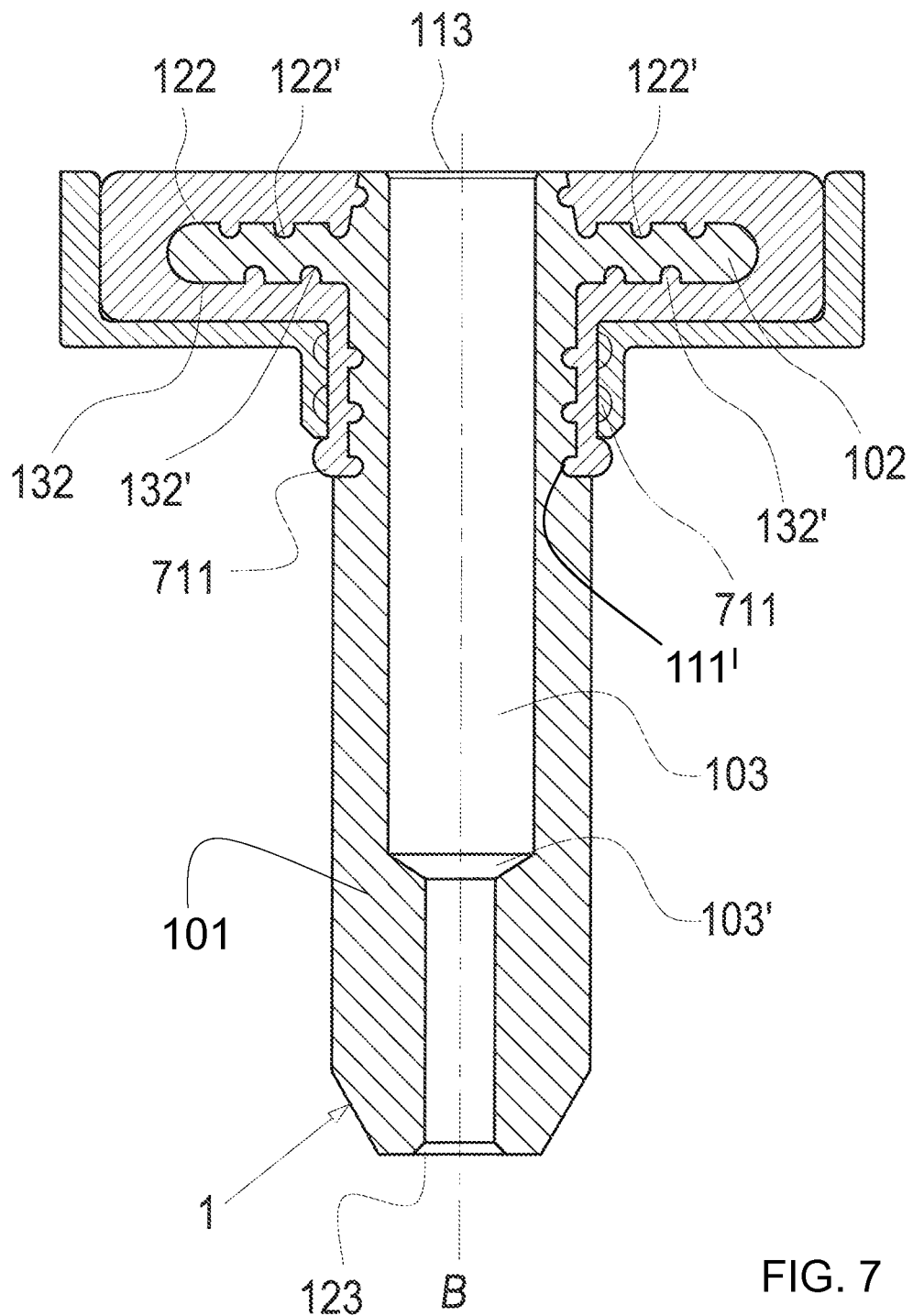
FIG. 7 shows a longitudinal sectional view of the shut-off member of the present invention, with an elastomeric coating and a containing cap.

In one embodiment, as shown in FIG. 7, such piston shut-off member 1 is interiorly hollow and has a through hole 103 that axially extends through the enlarged head 102 and the shaft 101 of said shut-off member 1, thereby creating two opposed openings along the longitudinal axis B of the piston shut-off member 1, i.e. an opening 113 at the center of the enlarged head 102 and an opening 123 at the free end of the shaft 101.

Such hole 103 may have a shoulder $103^I$ therein, at the end of the shaft 101 opposite to the enlarged head 102.

As is known, such hole 103 forms the housing seat for a thrust spindle 6 that is part of a pressure compensating mechanism, said mechanism being located in the body of the pressure regulator device.

The end of the shaft 101 opposite to the enlarged head 1o2 is sealingly and slideably supported in a guide hole formed in a wall opposite to the wall with the valve seat 313, with a seal element 5, such as an O-ring or the like, delimiting such hole.

Figure 3:
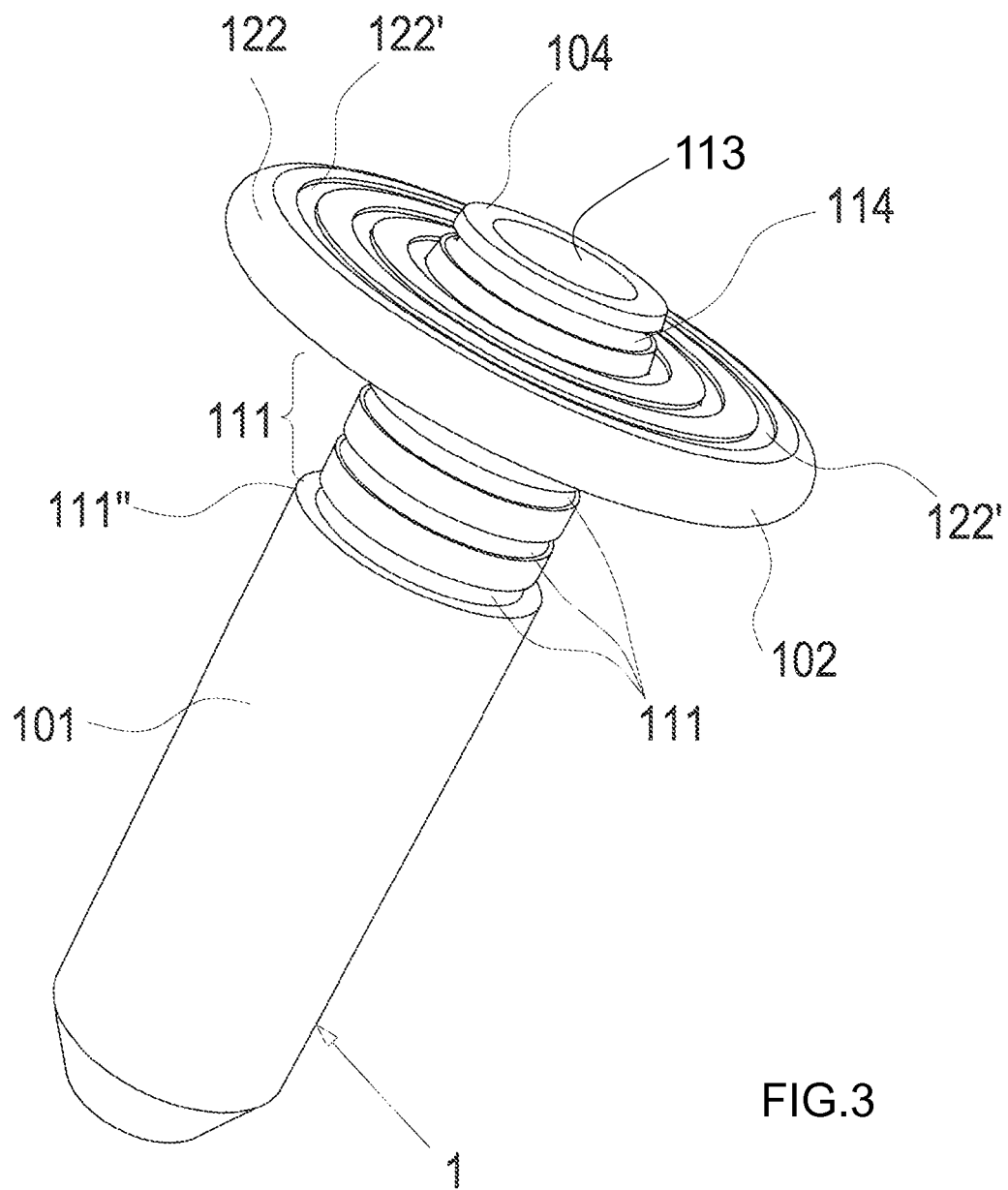
FIG. 3 shows a lateral view of the shut-off member of the present invention, with no elastomeric coating.

As shown in FIGS. 3 and 7, the upper face 122 of the enlarged head 102 facing away from the shaft 101, that forms an abutment surface against the valve seat 313, has an axial extension of the shaft 101, that terminates with an annular flange 104 surrounding the opening 113 of a through hole 103, said hole 103 and/or said opening 113 being situated at the center of said enlarged head 102.

Such axial extension of the shaft 105 may have at least one peripheral annular groove 114.

The outside diameter of this axial extension 104 is obviously smaller than the diameter of the opening of the valve seat 313, such that said seat 313 can be unrestrainedly sealed by the top face 122 of the enlarged head 102.

The top face 122 and/or the bottom face 132 of the enlarged head 102 have at least one annular groove $122^I$, $132^I$ that surrounds the axial extension 104 and/or the shaft 101 respectively.

Two or more annular grooves are arranged on one or both of the surfaces 122, 132 at equal or different distances from each other.

In one embodiment, said grooves $122^I$, $132^I$ may either be one, two or more annular grooves, as shown in FIG. 3, or be for example, alternatively or in combination, a single spiral groove that extends from the central opening 113 toward the peripheral edge of the enlarged head 102. In one embodiment, the shaft 101 has a radially narrowed end portion 111 at its end connected to the enlarged head 102, with at least one peripheral annular groove $111^I$ being provided thereat, in said portion of the shaft 101.

As shown in FIG. 3, such radially narrowed portion 111 forms an annular step or an annular shoulder $111^{II}$ on the circumference that connects it to the remaining portion of the shaft 101.

One or more annular peripheral grooves $111^I$ may be provided at equal or different distances from each other on the radially narrowed end portion 111 of the shaft 101, as shown in FIG. 3 or, in addition to or instead of such annular peripheral grooves, a single spiral groove may be provided in the radially narrowed end portion 111 of the shaft 101.

Such narrowed portion 111 may be designed to have an outside diameter identical to the outside diameter of the axial extension 104 off the shaft, on the face 122 of the enlarged head 102 which faces away from the shaft 101.

In a preferred embodiment, such radially narrowed end portion 111 extends over a smaller portion of said length of the shaft 101, as compared with the entire length of the shaft 101. Such narrowed portion 111, particularly such radially narrowed end portion with one or more annular peripheral grooves 111$^I$, is not located at the shaft portion designed to cooperate with the seal element 5.

Figure 4:
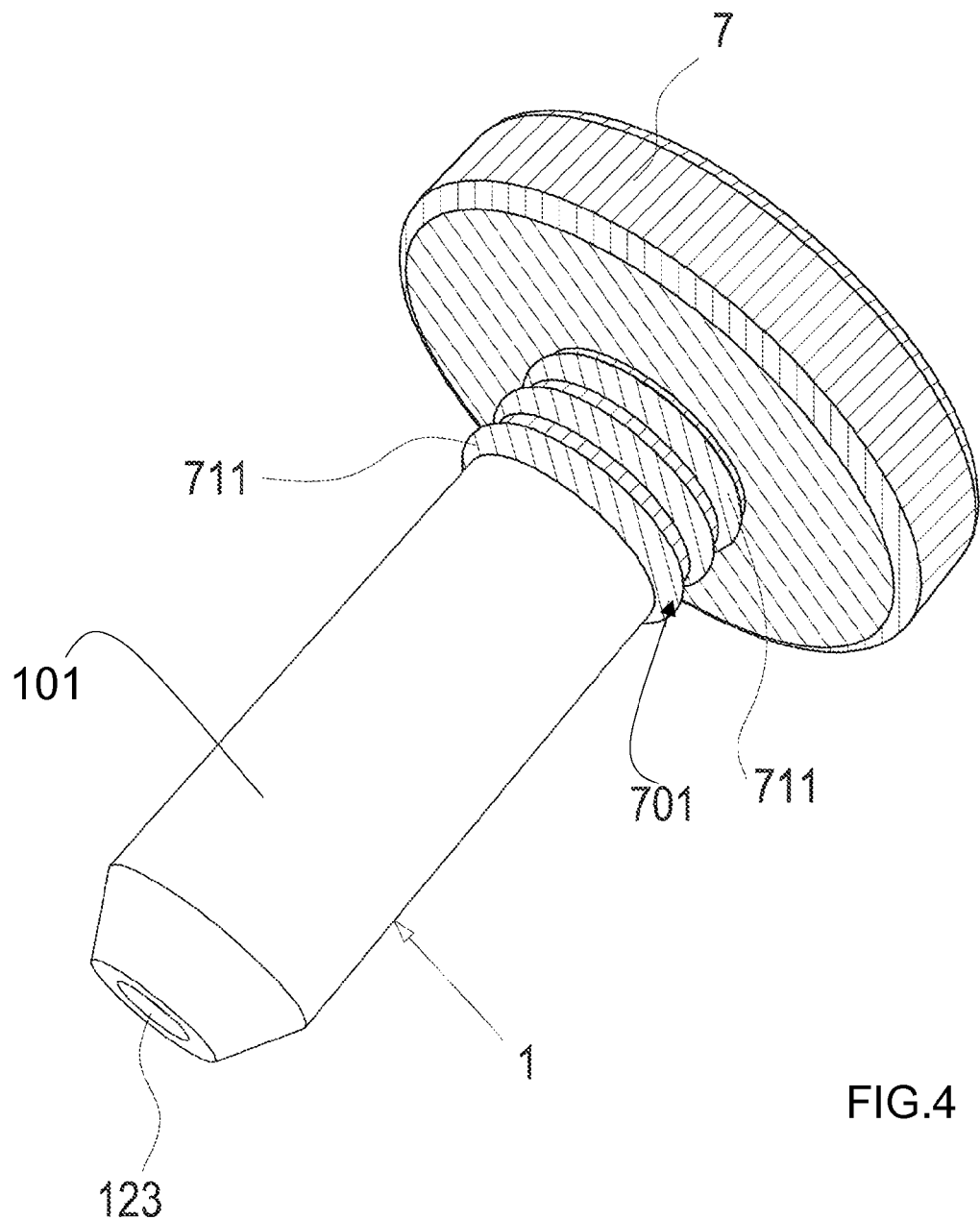
FIG. 4 shows a lateral view of the shut-off member of the present invention, with an elastomeric coating.
Figure 5:
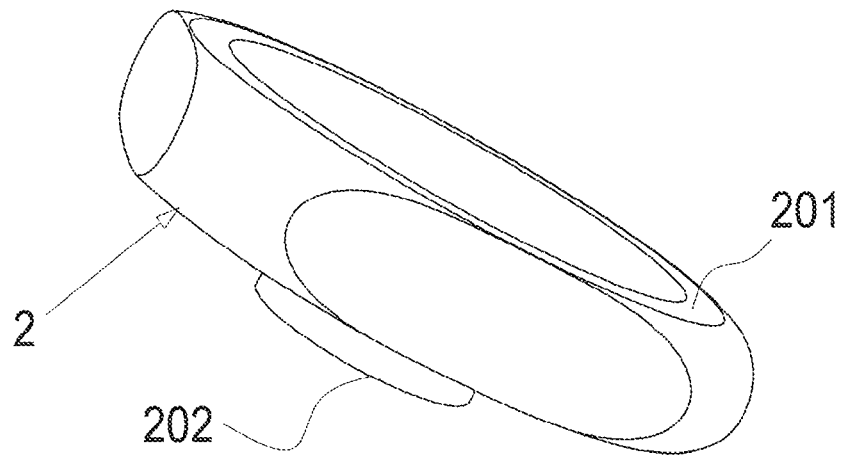
FIG. 5 shows a lateral view of the containing cap.

As shown in FIG. 4, the shut-off member 1 is seamlessly coated with at least one layer of an elastomeric material, which forms a coating 7 for the enlarged head 102 and part of the shaft 101, such coating being also provided over a predetermined length of an end section of the shaft, at the end of the shaft 101 connected to said enlarged head 102.

Said coating of elastomeric material 7 is limited to an end portion of the shaft connected to the enlarged head and said coated portion of the shaft 101 is entirely contained in the high-pressure chamber 301 in any operating position of the shut-off member.

Therefore, the elastomeric coating 7 does not extend to the portion of the shaft 101 that is designed to cooperate with the seal element 5 that sealingly delimits the guide hole for the shaft 101, said hole being formed in a wall of the chamber supplied with high-pressure gas, opposite to the valve seat 313.

Figure 1B:
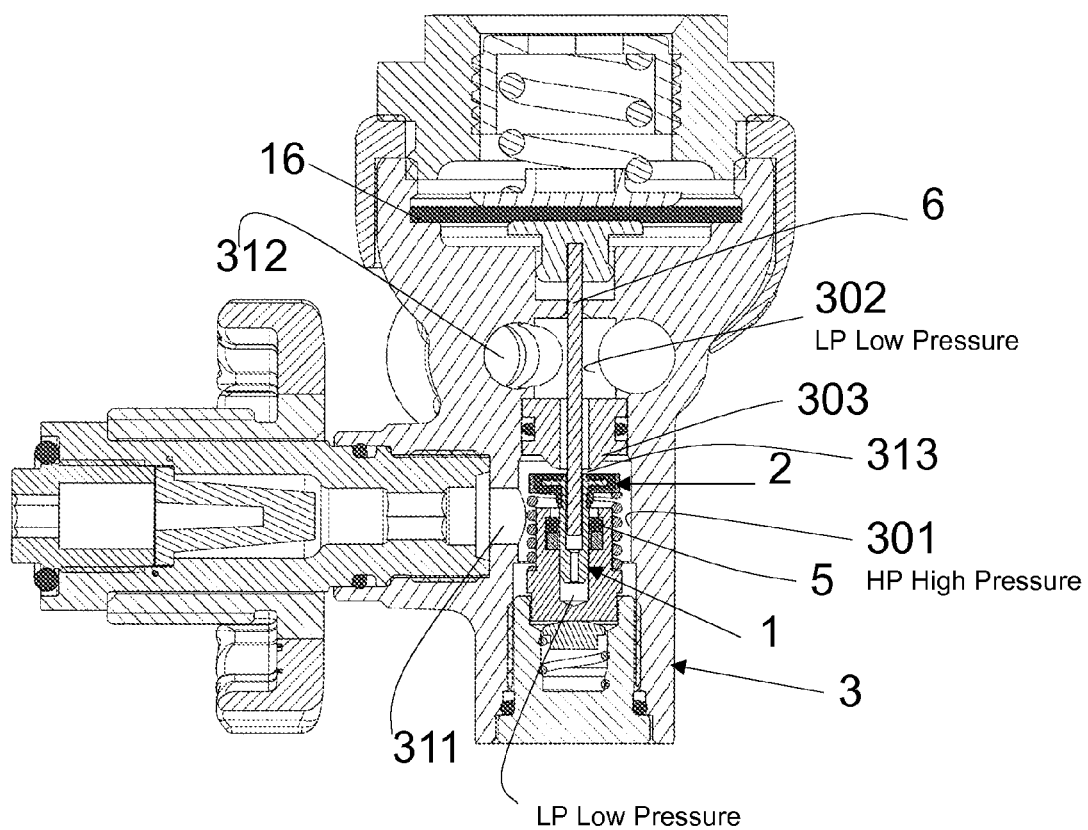
FIG. 1b shows a longitudinal sectional view of a further embodiment of a pressure regulator device, particularly a diaphragm-type first stage for underwater diving, with a lateral high-pressure gas inlet, and with a pressure reducing valve having a shut-off member of the present invention.
Figure 1C:
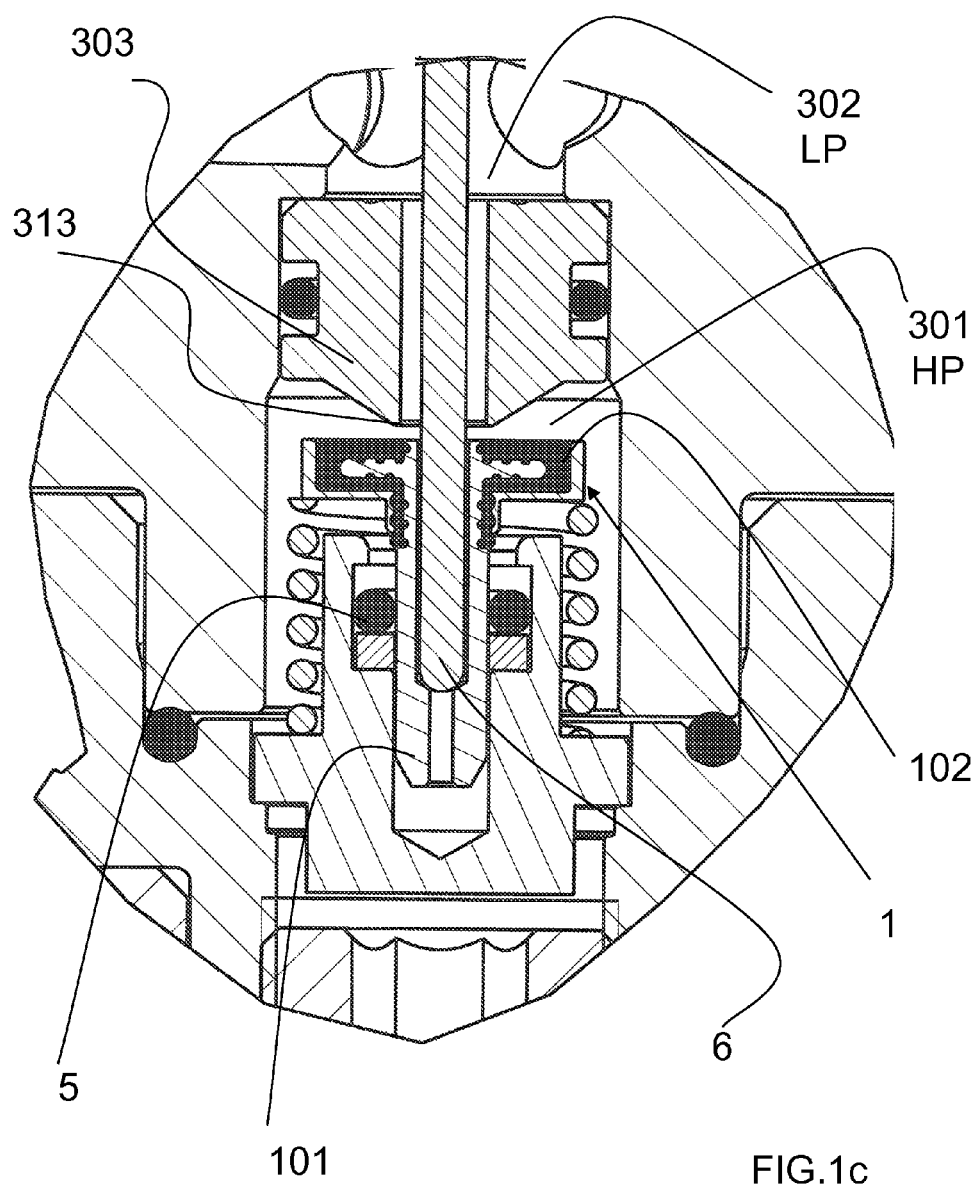
FIG. 1c shows an enlarged view of the pressure reducing valve having a shut-off member of the present invention, in a diaphragm-type first stage for underwater diving, with a longitudinal high-pressure gas inlet as shown in FIG. 1a, FIG. 1d shows an enlarged view of the pressure reducing valve having a shut-off member of the present invention, in a diaphragm-type first stage for underwater diving, with a lateral high-pressure gas inlet as shown in FIG. 1b.
Figure 1D:
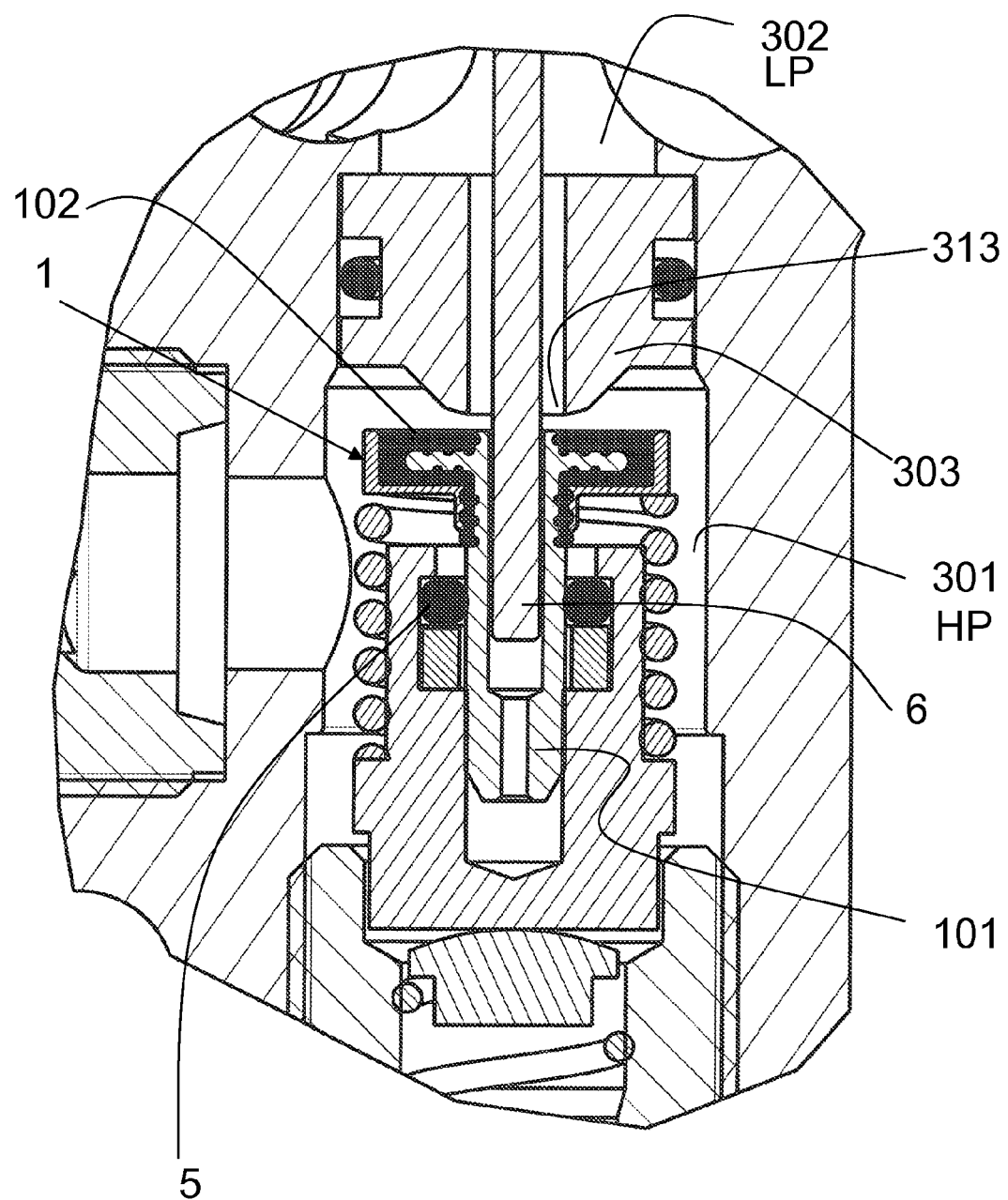
Figure 2:
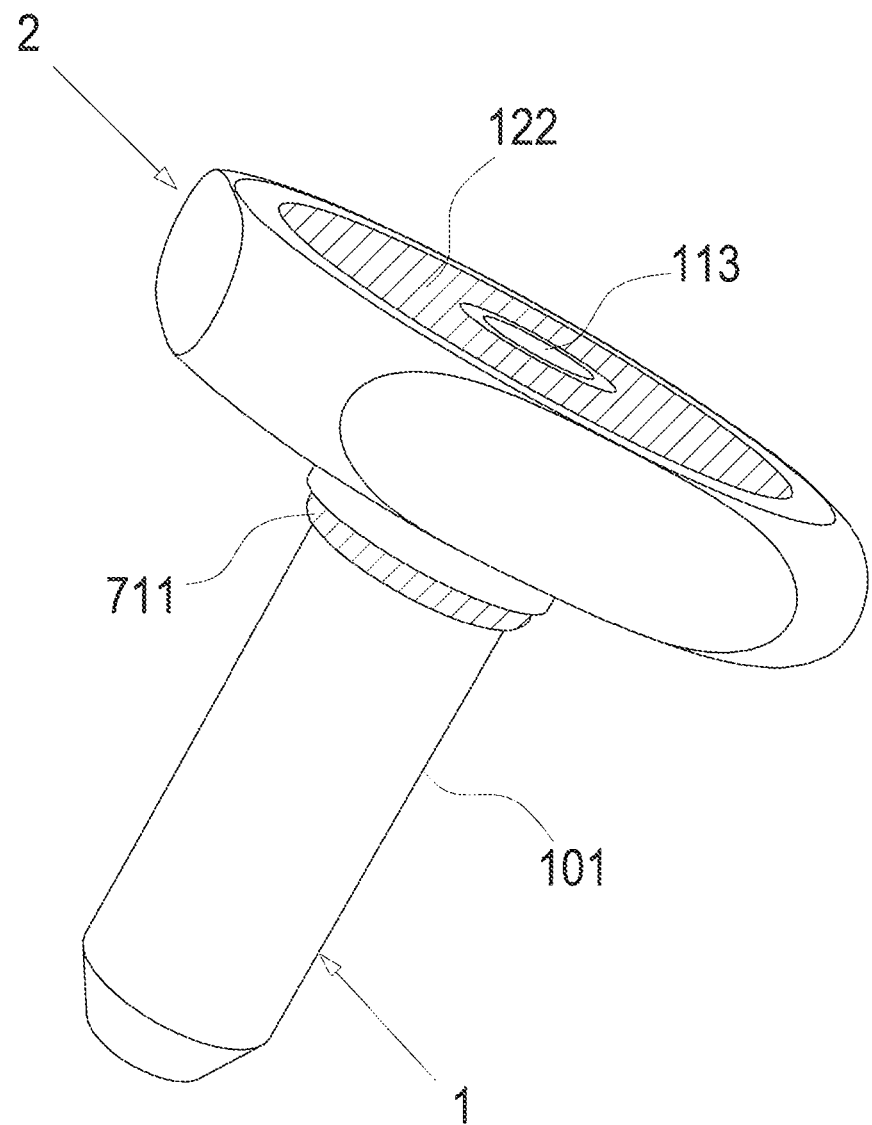
FIG. 2 shows a lateral view of a shut-off member of the present invention, in combination with a containing cap for the enlarged head of the shut-off member.

FIGS. 1c and 1d show the shut-off member 1 in the high-pressure chamber 301 away from the valve seat 313: the figures show that the elastomeric coating 7 only covers a part of the shaft 101 that is contained in the high-pressure chamber 301, said portion having a limited length as compared with the total longitudinal length of the shaft 101, such that even in the open condition of the pressure reducing valve, i.e. when the head 102 of the shut-off member 1 is away from the valve seat 313 and the shaft 101 longitudinally slides in the hole delimited by the seal element 5 on the wall of the high-pressure chamber facing away from the valve seat 313, the elastomeric coating does not cooperate with said seal element 5.

In one embodiment, such elastomeric coating 7 covers the enlarged head 102 and extends over a section of the shaft 101 that corresponds to the radially narrowed end portion 111, by a bush-like extension of the coating.

The elastomeric material of the coating 7 has chemico-physical properties allowing said coating 7 to withstand the operating pressures of the pressure regulator device, particularly the pressures in the high-pressure chamber 301, and to ensure a pressure-resistant sealing action against the valve seat, when the shut-off member 1 is in the closed position.

For example, appropriate flexibility and resilience properties may be obtained using a thermoplastic elastomeric material.

The elastomeric coating 7 does not extend to the portion of the shaft 101 that is designed to cooperate with the seal element 5.

This avoids deformations on the shaft 101 at its outer surface designed to cooperate with said seal element 5, but allows direct cooperation between the hard surface, such as metal or the like, of the shaft 101 and the soft surface of the elastomeric material that forms the seal element 5, thereby avoiding deformations on the shaft surface or alterations of the material that forms the seal 5, that might lead to inappropriate operation of the pressure reducing valve.

During overmolding of the elastomeric material that forms the coating 7, the axial extension 104 may act as an anchor for the elastomeric material, and prevent migration of such material into the opening 113 of the axial hole 103 of the shut-off member 1. An annular step or shoulder 111$^{II}$ on the shaft 101 forms an anchor point for the elastomeric material and acts as a retaining shoulder during molding of the elastomeric coating material 7.

The groove/s 114, 111$^I$, 122$^I$, 132$^I$, on the axial extension 104 and/or on the enlarged head 102 and/or the narrowed portion 111 of the shaft 101 form, during overmolding, a larger coupling surface for the elastomeric coating 7, said coupling surface preventing penetration of gas microbubbles between the body of the shut-off member 1 and the elastomeric coating 7.

In one embodiment, the bush-like extension of the elastomeric coating 7 that covers the radially narrowed end portion 111 has an outside diameter substantially identical to the remaining uncoated portion of the shaft 101, when applied to the radially narrowed portion.

In certain particular cases, for improved adhesion between the body of the shut-off member 1 and the coating 7, at least one adhesive layer or adhesive primer is provided, whose chemico-physical properties depend on the hard material that forms the body of the shut-off member 1 and the material that forms the coating 7.

In one embodiment, the bush-like extension 701 of the coating 7 has one or more annular bulges 711 on its outer surface.

Said annular bulge/s 711 may be provided at or near the groove/s 111$^I$ of the radially narrowed end portion 111 or may be offset from said groove/s 111$^I$.

At least one annular bulge 711 may be provided at or near the annular groove or annular shoulder 111$^{II}$ of the shaft 101.

Particularly, bulges, particularly annular bulges 701 are formed at the annular step or the annular shoulder 111$^{II}$ of the shaft 101 and/or at the radially narrowed end portion 111, said bulges forming resilient engagement rings for elastically retaining a containing cap 2 for said enlarged head in abutment against the enlarged head 101 of the shut-off member 1, which cap may be formed to also act as a slide guide for said shut-off member 1 in the high-pressure chamber 301.

This cap 2, which is adapted to slide integrally with the shut-off member 1, has a bell part 201 for tightly receiving the enlarged head 102 of the shut-off member 1, which bell part 201 is formed of one piece with a central tubular extension 202 whose inside diameter is substantially identical or larger than the diameter of the shaft 101 coated with the plastic material, so that said cap 2 may be fitted onto the shaft 101 and pushed to abutment against the enlarged head 102 of the shut-off member 1.

Such bell part 201 has a central opening 211 which, like the tubular central extension 202, allows the passage of the coated shaft 101, as said cap 2 is mounted to said shut-off member 1.

Preferably, such central tubular extension 202 of the cap 2 has an inside diameter that is smaller than that of the annular elastomeric bulges 701 on the coating 7 of the shaft 101 so that pressure upon said annular bulges 701 creates a force that holds the cap 2 in position and a succession of annular sealing areas along the shaft 101.

In one embodiment, at least one annular bulge 711 is provided on the shaft 101 at the end of the bush-like extension 701 of the elastomeric coating 7 at such a distance from the enlarged head 102 of the shut-off member 1 that, with the containing and slideably guiding cap 2 in the mounted state, it overlies the end side of the central tubular extension 202 of said cap 2, thereby creating a mechanical retention action by snap coupling, and an additional sealing area along said end edge.

Thus, the cap 2 acts as an additional coating element over the elastomeric layer 7 and provides an additional sealing effect, to prevent peeling off of the elastomeric material 7 due to high operating pressure stresses.

This cap 2 may also act as a slide guide element for the axial movement of the piston shut-off member 1 in the high-pressure chamber 301, and prevent any misalignment or flare, because the bell-shaped head 201 has such an outside diameter as to allow a free axial sliding movement of the cap 2 in the high-pressure chamber 301.

In one embodiment, the bell-shaped head has a polygonal, preferably square plan shape, with rounded corners. These rounded portions 231 at the corners have a bend radius identical or smaller than the bend radius of the inner cylindrical surface 311 of the high-pressure chamber 301, said rounded portions 231 being tangent at least at one point or arch to said inner cylindrical surface 311.

The alternation of flat portions 221 and rounded portions 231 along the edge of the bell-shaped head 201 of the cap 2 allows free axial movement of the cap 2, associated with the shut-off member 1, in the high-pressure chamber 301, while preventing friction with the inner surface 311 of said chamber 301 and allowing free circulation of gas in said chamber 301.

Figure 6:
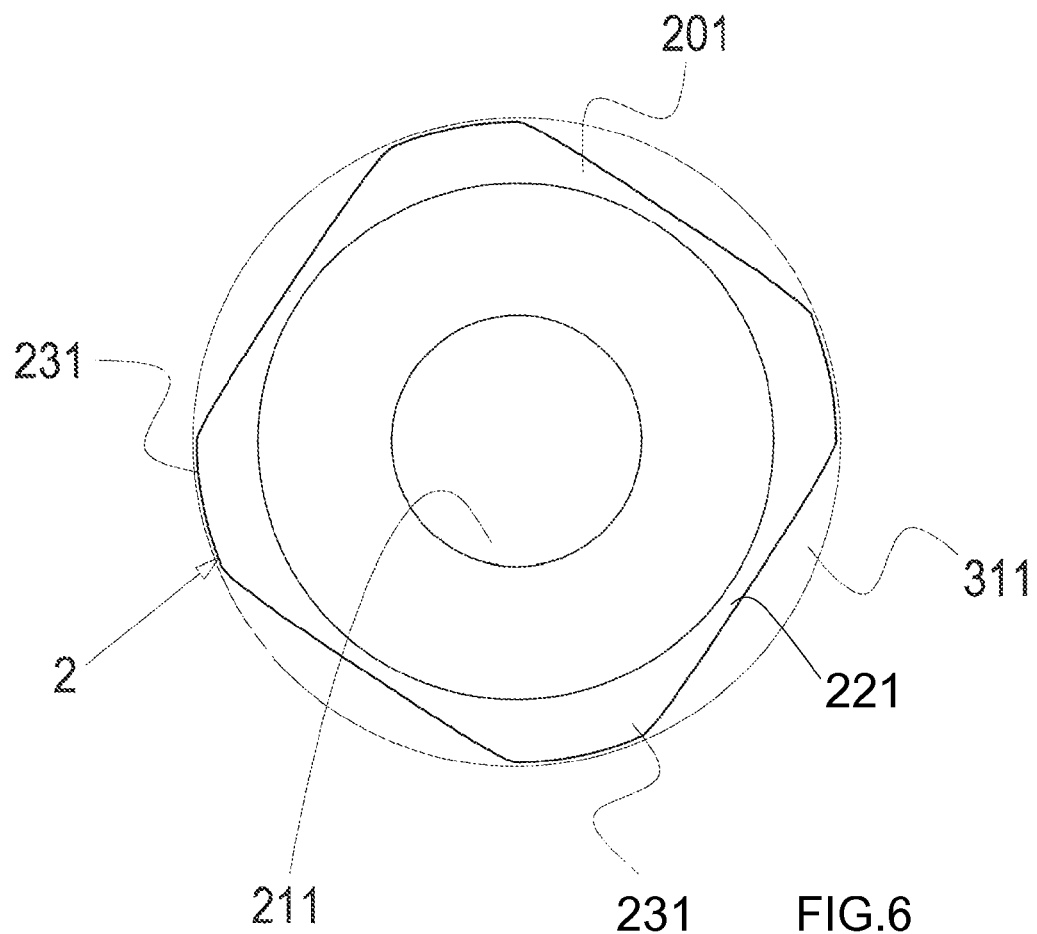
FIG. 6 shows a plan view of the containing cap.

As shown in FIG. 6, gas may freely circulate between the flat portions 221 of the edge of the bell-shaped head 201 of the cap 2 and the inner surface 311 of the high-pressure chamber 301, and flow into the low-pressure chamber 302 through the opening of the valve seat 313, in the open state of the valve, i.e. when the head of the shut-off member 1 does not abut against said seat 313.

Reference has been made in the text and drawings hereof to a cylindrical geometry for high- and low-pressure chambers and the pressure reducing valve, as this geometry is best suited to avoid friction between sliding parts. Nevertheless, the inventive concepts as disclosed and claimed herein are not limited to this geometry, and any geometry may be envisaged for these chambers and this valve, e.g. a polygonal geometry.

As shown in FIGS. 1a and 1b, the bottom face of the bell-shaped head 201 of the cap, connected to the central tubular extension 202, acts as a base for a resilient element such as a spring, which is adapted to bias the shut-off member 1 against the valve seat to the closed state, during the known operation of the pressure regulator device.

In the first diaphragm-type pressure reducing stages for underwater diving, whose function is to reduce the pressure of inflowing air (i.e. the pressure of the tank with which the first stage is connected) to a predetermined intermediate pressure in addition to ambient pressure, the air demand by the scuba diver creates a negative pressure in the low-pressure chamber 302, said negative pressure causing the deformation of an elastic diaphragm 16 associated with a thrust spindle 6 that transfers the movement of this diaphragm 16 to the mechanism of the valve, i.e. the shut-off member 1. Therefore, under this air-demand condition, the shut-off member 1 moves away from the valve seat 313 and allows gas to flow from the high-pressure chamber 301 connected to the tank, to the chamber at lower pressure, i.e. the low-pressure chamber 302, and hence toward the use, through the outlet. When the diver is not inhaling, i.e. when a balance exists between the pressures in the first-stage chambers, the shut-off member 1 is held against the valve seat 313 by a spring which, as mentioned above, acts against the lower surface of the cap 2 associated with the shut-off member 1, whereby the shut-off member 1 does not move, and the valve remains in the closed state.

The use of a piston shut-off member 1 as described above is not limited to a first pressure reducing stage for underwater diving, but may be used in any pressure regulator device, such as a device for supplying air or other gases in emergency situations, such device having therein a valve for reducing gas pressure from a high pressure to a lower, or operating pressure, the valve having a valve seat that may be opened or closed by a piston shut-off member.

While the invention has been described in connection with the above described embodiments, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become apparent to those skilled in the art and the scope of the present invention is limited only by the appended claims.

The invention claimed is:

1. A shut-off member (1) of a pressure reducing valve of a pressure regulator device, said shut-off member (1) comprising:
   a head (102) cooperating with a valve seat (313) that separates a high-pressure chamber supplied with high pressure gas (301) from a chamber in which gas is at lower pressure (302); and
   a shaft (101) coupled to said head,
   wherein said head has a diameter larger than a diameter of said shaft,
   wherein said head (102) and an end section of predetermined length of said shaft (101) have a seamless coating of at least one layer of an elastomeric material, said predetermined length being such that a coated end section of said shaft (101) is entirely contained in the high-pressure chamber (301) in any operating position of said shut-off member,
   wherein a surface of the head (102) and of the shaft (101) coated with said elastomeric material (7) have one or more separate or continuous recesses ($111^I$, $122^I$, $132^I$) arranged in predetermined patterns, and
   wherein a top face of the head (102) facing away from the shaft and toward the valve seat (313) has an axial shaft extension that ends with an annular flange (104) surrounding an opening (113) of a through hole (103) that axially extends through the head and the shaft of said shut-off member (1), said hole or said opening being situated in a central position of said head (102).

2. The shut-off member (1) as claimed in claim 1, wherein said annular flange (104) has at least one peripheral annular groove (114).

3. The shut-off member (1) as claimed in claim 1, wherein the one or more recesses on one or both of the top face (122) of the head abutting against the valve seat (313) or a bottom face (132) of the head are shaped as one or more annular grooves ($122^I$, $132^I$) surrounding one of both of the opening (113) or the shaft (101).

4. The shut-off member (1) as claimed in claim 1, wherein the shaft (101) has a radially narrowed end portion (111) at an end thereof coupled to the enlarged head (102), said radially narrowed end portion (111) forming an annular step or an annular shoulder ($111^{II}$) on a circumference that connects said radially narrowed end portion (111) to a remaining portion of the shaft (101).

5. The shut-off member (1) as claimed in claim 4, wherein at least one peripheral annular groove ($111^I$) is provided on said radially narrowed end portion (111).

6. The shut-off member (1) as claimed in claim 4, wherein said coating (7) covers the enlarged head (102) and extends over a section of the shaft (101) that corresponds to the radially narrowed end portion (111) by a bush-shaped extension of said coating (7).

7. The shut-off member (1) as claimed in claim 6, wherein the bush-shaped extension of said coating (7) that covers the radially narrowed end portion (111) has an outside diameter substantially identical to a remaining uncoated portion of the shaft (101).

8. A shut-off member (1) of a pressure reducing valve of a pressure regulator device, said shut-off member (1) comprising:
- a head (102) cooperating with a valve seat (313) that separates a high-pressure chamber supplied with high pressure gas (301) from a chamber in which gas is at lower pressure (302); and
- a shaft (101) coupled to said head,
- wherein said head has a diameter larger than a diameter of said shaft,
- wherein said head (102) and an end section of predetermined length of said shaft (101) have a seamless coating of at least one layer of an elastomeric material, said predetermined length being such that a coated end section of said shaft (101) is entirely contained in the high-pressure chamber (301) in any operating position of said shut-off member,
- wherein the shaft (101) has a radially narrowed end portion (111) at an end thereof coupled to the head (102), said radially narrowed end portion (111) forming an annular step or an annular shoulder (111$^H$) on a circumference that connects said radially narrowed end portion (111) to a remaining portion of the shaft (101),
- wherein said coating (7) covers the head (102) and extends over a section of the shaft (101) that corresponds to the radially narrowed end portion (111) by a bush-shaped extension of said coating (7), and
- wherein said elastomeric coating (7) has one or more bulges shaped as annular bulges on an outer surface of the bush-shaped extension.

9. The shut-off member (1) as claimed in claim 8, wherein said one or more bulges (701) are formed at or near one or more of the shoulder (111$^H$) of the shaft (101) or the narrowed end portion (111), and act as resilient engagement members for elastically retaining a containing cap (2) for the head (102) in abutment against the head (102), the cap (2) being configured to slide with the shut-off member (1) in said high-pressure chamber (301).

10. The shut-off member (1) as claimed in claim 9, wherein said shut-off member (1) is provided with the containing cap (2) for the head (102), said containing cap (2) having a bell-shaped part (201) for tightly receiving the head (102), said bell-shaped part (201) being formed of one piece with a central tubular extension (202) having an inside diameter that is substantially identical or larger than a diameter of the shaft (101) coated with the elastomeric material (7), such that said cap (2) is configured to be fitted onto the shaft (101) and pushed to abutment against the head (102) of the shut-off member (1).

11. The shut-off member (1) as claimed in claim 10, wherein said central tubular extension (202) of the containing cap has the inside diameter that is smaller than an inside diameter of the annular bulges (701) on the coating (7) of the shaft (101) such that pressure exerted upon said annular bulges (701) creates a force that holds the cap (2) in position and a succession of annular sealing areas along the shaft (101).

12. The shut-off member (1) as claimed in claim 10, wherein at least one annular bulge (701) is provided on the shaft (101) at an end of the bush-shaped extension of the coating (7) at such a distance from the head (102) that, with the containing cap (2) in mounted state, said at least one annular bulge (701) at least partly overlies an end edge of the central tubular extension (202) of said cap (2), thereby creating a mechanical retention action by snap coupling, and an additional sealing area along said end edge.

13. The shut-off member (1) as claimed in claim 10, wherein the bell-shaped part (201) of the cap (2) has a polygonal shape with rounded corner portions, said rounded corner portions (231) having a bend radius identical or smaller than a bend radius of an inner cylindrical surface (311) of the high-pressure chamber (301), said rounded corner portions (231) being tangent at least at one point or arch to said inner cylindrical surface (311).

14. A pressure regulating device with a pressure reducing valve, said device comprising:
- a shut-off member (1) comprising:
  - a head (102) cooperating with a valve seat (313) that separates a high-pressure gas chamber supplied with high pressure gas (301) from a chamber in which gas is at lower pressure (302); and
  - a shaft (101) coupled to said head,
- wherein said head has a diameter larger than a diameter of said shaft,
- wherein said head (102) and an end section of predetermined length of said shaft (101) have a seamless coating of at least one layer of an elastomeric material, said predetermined length being such that a coated end section of said shaft (101) is entirely contained in the high-pressure gas chamber (301) in any operating position of said shut-off member,
- wherein a surface of the head (102) and of the shaft (101) coated with said elastomeric material (7) have one or more separate or continuous recesses (111$^I$, 122$^I$, 132$^I$) arranged in predetermined patterns,
- wherein a top face of the head (102) facing away from the shaft and toward the valve seat (313) has an axial shaft extension that ends with an annular flange (104) surrounding an opening (113) of a through hole (103) that axially extends through the head and the shaft of said shut-off member (1), said hole or said opening being situated in a central position of said head (102), and
- wherein the valve seat on said valve cooperates with said shut-off member (1).

15. The device as claimed in claim 14, wherein said device is a diaphragm-type first pressure reducing stage for underwater diving comprising:
- a body, having an inlet (311) connected to a high-pressure breathable gas source and an outlet (312) for breathable gas at a pressure which is lower than a pressure at the inlet, said body being divided into said high-pressure gas chamber (301) communicating with said inlet (311), and said low-pressure gas chamber (302) communicating with said outlet (312), said low-pressure gas chamber (302) communicating with the high-pressure gas chamber (301) through said pressure reducing valve,
- wherein said pressure reducing valve comprises said valve seat formed on a first wall that separates the high-pressure chamber (301) from the low-pressure chamber (302), and said shut-off member (1) having said head (102) connected to said shaft (101), said head cooperating with said valve seat for closing and opening said valve, and
- wherein said shut-off member (1) is displaceable in forward and rearward directions along a longitudinal axis of the shaft, and in a fluid-tight manner in the high-pressure chamber (301) such that the head (102) alternately runs a first stroke, in which said head moves off and away from said seat for opening the valve, and a second stroke, in which said head moves towards and against said valve seat (313) for closing the valve, whereas the shaft (101) is supported to slide in the fluid-tight manner through an opening on a second wall of the high-pressure chamber, facing away from the first wall with said valve seat, using a sealing element (5).

* * * * *